(12) United States Patent
Schechter

(10) Patent No.: US 12,282,473 B2
(45) Date of Patent: Apr. 22, 2025

(54) UPDATING A DIGITAL MAP

(71) Applicant: Bayerische Motoren Werke Aktiengesellschaft, Munich (DE)

(72) Inventor: Dimitri Schechter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 883 days.

(21) Appl. No.: 16/225,204

(22) Filed: Dec. 19, 2018

(65) Prior Publication Data

US 2019/0121798 A1  Apr. 25, 2019

Related U.S. Application Data

(63) Continuation of application No. PCT/EP2017/063263, filed on Jun. 1, 2017.

(30) Foreign Application Priority Data

Jun. 21, 2016 (DE) ............. 10 2016 211 045.4

(51) Int. Cl.
  *G06F 16/23* (2019.01)
  *G01C 21/00* (2006.01)
  (Continued)

(52) U.S. Cl.
  CPC ......... *G06F 16/2358* (2019.01); *G01C 21/34* (2013.01); *G01C 21/387* (2020.08);
  (Continued)

(58) Field of Classification Search
  CPC ..... G06F 16/2358; G06F 16/29; G01C 21/32; G01C 21/34; G01C 21/387; G01C 21/3896; G09B 29/003
  See application file for complete search history.

(56) References Cited

U.S. PATENT DOCUMENTS

| | | | |
|---|---|---|---|
| 6,453,233 B1* | 9/2002 | Kato | G06F 16/25 701/451 |
| 2007/0126605 A1* | 6/2007 | Aleksic | G01C 21/32 340/995.14 |

(Continued)

FOREIGN PATENT DOCUMENTS

| | | | | |
|---|---|---|---|---|
| CN | 10134400 B | * | 1/2011 | ......... G01C 21/3896 |
| CN | 102194366 B | * | 11/2013 | ............. G01C 21/32 |

(Continued)

OTHER PUBLICATIONS

International Search Report (PCT/ISA/210) issued in PCT Application No. PCT/EP2017/063263 dated Jul. 27, 2017 with English translation (five pages).

(Continued)

*Primary Examiner* — Nga X Nguyen

(74) *Attorney, Agent, or Firm* — Crowell & Moring LLP

(57) ABSTRACT

A method updates a digital map stored in a vehicle. The updated map is consistent and at the same time the amount of data transferred is small. The map has a plurality of map objects, wherein an object identifier and a version number are associated with each map object. The method determines a first map object to be updated, transfers a request data set for updating the first map object from the vehicle to a central computer, wherein the request data set includes the object identifier and the version number of the first map object, determines a change operation of the first map object with respect to the version of the first map object that is indicated by the sent version number, determines further map objects changed in the change operation, assembles an update data set, and transfers the update data set from the central computer to the vehicle.

11 Claims, 2 Drawing Sheets

(51) Int. Cl.
*G01C 21/34* (2006.01)
*G06F 16/29* (2019.01)
*G09B 29/00* (2006.01)

(52) U.S. Cl.
CPC ......... *G01C 21/3896* (2020.08); *G06F 16/29* (2019.01); *G09B 29/003* (2013.01)

(56) References Cited

U.S. PATENT DOCUMENTS

| | | | | |
|---|---|---|---|---|
| 2007/0156759 | A1* | 7/2007 | Sekine | G01C 21/3859 |
| 2009/0150457 | A1* | 6/2009 | Nakamura | G09B 29/10 |
| | | | | 707/999.203 |
| 2009/0177706 | A1* | 7/2009 | Takahata | G01C 21/32 |
| 2009/0216771 | A1* | 8/2009 | Nakamura | G01C 21/32 |
| 2010/0017108 | A1 | 1/2010 | Nakamura et al. | |
| 2010/0063727 | A1* | 3/2010 | Umezu | G08G 1/0969 |
| | | | | 701/532 |
| 2010/0286903 | A1 | 11/2010 | Meschenmoser | |
| 2011/0040478 | A1* | 2/2011 | Rinscheid | G06F 21/6218 |
| | | | | 701/532 |
| 2011/0106431 | A1* | 5/2011 | Tomobe | G01C 21/32 |
| | | | | 701/533 |
| 2011/0270798 | A1* | 11/2011 | Nagasaka | G01C 21/32 |
| | | | | 707/609 |
| 2012/0065811 | A1* | 3/2012 | Nakamura | G01C 21/32 |
| | | | | 701/1 |
| 2012/0130944 | A1* | 5/2012 | Masuda | G01C 21/32 |
| | | | | 707/E17.01 |
| 2013/0275371 | A1* | 10/2013 | Chang | G01C 21/32 |
| | | | | 707/609 |
| 2015/0066366 | A1* | 3/2015 | Pang | G06Q 20/14 |
| | | | | 701/532 |
| 2016/0047658 | A1* | 2/2016 | Nishide | G01C 21/32 |
| | | | | 701/532 |
| 2016/0259814 | A1* | 9/2016 | Mizoguchi | G01C 21/3837 |

FOREIGN PATENT DOCUMENTS

| | | | |
|---|---|---|---|
| DE | 103 37 621 A1 | 4/2005 | |
| DE | 102007048264 A1 * | 4/2009 | ............ G01C 21/32 |
| KR | 20090015139 A * | 2/2009 | ............ G08G 1/096 |
| WO | WO 2005/019773 A1 | 3/2005 | |

OTHER PUBLICATIONS

German-language Written Opinion (PCT/ISA/237) issued in PCT Application No. PCT/EP2017/063263 dated Jul. 27, 2017 (seven pages).

German-language Search Report issued in counterpart German Application No. 10 2016 211 045.4 dated May 2, 2017 with partial English translation (14 pages).

* cited by examiner

UPDATING A DIGITAL MAP

CROSS REFERENCE TO RELATED APPLICATIONS

This application is a continuation of PCT International Application No. PCT/EP2017/063263, filed Jun. 1, 2017, which claims priority under 35 U.S.C. § 119 from German Patent Application No. 10 2016 211 045.4, filed Jun. 21, 2016, the entire disclosures of which are herein expressly incorporated by reference.

BACKGROUND AND SUMMARY OF THE INVENTION

The present invention relates to a method for updating a digital map stored in a vehicle, to a method for carrying out an operation for changing a digital map stored in a central database, to a vehicle and to a central computer.

Modern vehicles, in particular motor vehicles, often have installed navigation systems which can be used to determine the current geographical position of the motor vehicle and to calculate a route to a destination. For this calculation, navigation systems have digital maps stored in the vehicle. So that such digital maps stored in the vehicle are always in a state which is as up-to-date as possible, there is the need to update a digital map as frequently and comprehensively as possible. It is known practice to update digital maps by introducing a data storage medium (for example a CD, a USB drive or the like), on which updated map data are stored, into the vehicle. Such a data storage medium can either remain in the vehicle, that is to say can replace the data storage medium for the digital map which was previously in the vehicle, or its contents may be copied to the data storage medium for the digital map which is in the vehicle.

Modern vehicles often have apparatuses for wireless data communication with communication participants outside the vehicle. For example, vehicles may be set up to interchange data with the Internet via mobile radio networks. Such data communication apparatuses open up another possibility for updating a digital map stored in the vehicle, namely by obtaining the updated map data via the mobile radio connection. Since the volume of data which can be transmitted via such a mobile radio connection is generally restricted for technical and economic reasons, it is problematic to update the entire digital map via a mobile radio connection.

In order to solve this problem, it is known practice to update only individual map objects of the digital map, rather than the entire digital map. For example, a digital map may be subdivided into geographical regions. When updating the digital map, only those map objects which are in the same geographical region as the vehicle can be updated, for example. Inconsistencies may occur in the case of such partial updating of the digital map. This can be understood as meaning that the digital map produced by the update has logical inconsistencies. If, for example, a new road is added by an update without those roads to which the new road is connected likewise being updated at the same time, the new road could "hang in the air" in the digital map produced by this update. In other words, although this digital map has the new road, it has no possibility of getting to this road.

In order to solve this problem, DE 103 37 621 A1 proposes the practice of first of all selecting an element subset to be updated in the digital map in the vehicle and requesting an update of this element subset. After such a request has been received, the control center automatically selects an additional element subset, in addition to the element subset to be updated, in such a manner that the digital map is consistent per se after the update. In other words, a central computer therefore supplements a requested set of map objects in such a manner that the digital map produced by the update is consistent per se. In practice, such methods in which all map objects required for a consistent map change are determined on the basis of a digital map stored in a central database have proved to be complicated. This is due to the fact that the map objects of a digital map have a high degree of mutual dependencies. Known methods for checking consistency therefore in practice result in a "chain reaction", with the result that large parts of the digital map are updated, which runs counter to the need for a transmitted volume of data which is as small as possible.

Digital maps are generally provided by map providers in central databases. These central databases are accessible via central computers, for example Internet servers. In order to update the digital map in the central database, new map objects are first of all captured, for example by means of capture journeys with capture vehicles belonging to the map provider. These new map objects are added to the database, but are not yet made accessible. A so-called "freeze" of the data pool is carried out at a particular time. Further map objects can then therefore no longer be added or updated. The entire digital map is then checked for consistency and corrected and/or supplemented if necessary. The current version of the digital map produced in this manner is then released, that is to say made accessible. In other words, a digital map is therefore not "continuously" updated. Rather, updated versions of the digital map are published at particular intervals of time.

Proceeding from the prior art, the object is to improve the updating of a digital map stored in a vehicle in such a manner that the updated map is consistent and, at the same time, the transmitted volume of data is small.

The inventive concept is reflected in the data management in the central database. Aspects of the invention therefore relate to a method for carrying out an operation for changing a digital map stored in a central database, wherein the map comprises a multiplicity of map objects. A map object may be, for example, a road or a road section (also referred to as a "link") or a "point of interest" (POI). An object identifier and a version number are assigned to each map object.

In order to carry out the change operation, the following steps are carried out according to the invention. At least one map object is first of all changed. The respective version number of each changed map object is incremented, that is to say increased by a counter. This should not be understood as being restrictive to an incrementation of natural numbers. A person skilled in the art is aware of a multiplicity of different methods for the data management of version numbers which are suitable for the present intended purpose. Furthermore, a change operation data record comprising:
(i) the object identifier of the at least one changed map object,
(ii) the version number of the at least one changed map object which was valid before the change operation and/or has been incremented, and
(iii) an identifier of the change operation, is stored according to the invention.

If a map object is newly added during a change operation, said map object is assigned a version number which allows a conclusion to be drawn that it is a newly added map object (for example "version 1").

In other words, not only are changes thus made to the digital map according to the invention, but these changes are also documented. The manner in which the digital map has been changed can be understood in this manner at later times. In particular, it is possible to understand which map objects have been changed together in the course of a change operation. It should be pointed out that there is no need, according to the invention, to store versions older than the current version of a map object itself. There is therefore no significant additional requirement for storage space for implementing the invention.

The method according to the invention for carrying out an operation for changing a digital map stored in a central database, as described above, is intended to be used as follows. An operation for changing the digital map is intended to consistently change the digital map per se. In other words, the digital map is intended to still be consistent after the change operation. For this purpose, it is necessary, with the change of a first map object, to also change those further map objects which are affected by the change of the first map object (so-called "dependent map objects"). This is also explained in more detail below on the basis of an exemplary embodiment.

The need to subject the digital map to a "freeze" and to check it overall for consistency at particular intervals of time, as described at the outset, is therefore eliminated. Instead, the digital map can now be continuously updated, wherein each individual change operation is intended to be carried out in such a manner that the consistency of the map is retained.

Moreover, the concept on which the invention is based is reflected in a method for updating a digital map stored in a vehicle. The map comprises a multiplicity of map objects, wherein an object identifier and a version number are assigned to each map object. In other words, the structure of the digital map stored in the vehicle corresponds to that of the digital map stored in the central database. However, some or all of the map objects of the map stored in the vehicle may not be in the up-to-date state (given by the digital map in the central database). This may also include the fact that a particular map object is not stored in the vehicle at all, specifically if this map object has not been updated (that is to say has been added for the first time in this case) in the vehicle since it was added to the central database.

The method comprises the following steps.

A first map object to be updated or a plurality of first map objects to be updated is/are first of all determined. A request data record for updating the first map object(s) is then transmitted from the vehicle to a central computer. It should be expressly pointed out that this method step and all subsequent method steps can also be carried out for a plurality of first map objects, but this is no longer explicitly pointed out below for reasons of better readability. The request data record comprises the object identifier and the version number of the first map object. The central computer may be, for example, an Internet server belonging to a map provider, with which the vehicle can interchange data via a mobile radio connection.

In the next step, an operation for changing the first map object in comparison with that version of the first map object which is identified by the transmitted version number is determined. In other words, a check is therefore carried out in order to determine whether that version of the first map object which is stored in the vehicle is up-to-date. If this is not the case, the first map object was updated in the course of at least one change operation in the central database. Those change operations which were used to change the first map object from its earlier version (available in the vehicle) to its current version (available in the central database) are then therefore determined. Each change operation of this type has an identifier.

In the next step, for each previously identified change operation, the further map objects changed during this change operation are determined. An update data record comprising:
(i) a current version of the first map object,
(ii) the version number of the current version of the first map object, and
(iii) the respective object identifier and the respective version number of the further map objects,
is then compiled. This update data record is transmitted from the central computer to the vehicle.

In other words, the invention therefore provides for the vehicle to first of all request a current version of a very specific map object (namely the first map object). A current version (including the information relating to the corresponding version number) of only this first map object is transmitted to the vehicle. However, the vehicle additionally receives, as part of the update data record, information relating to which further map objects have been changed together with the first map object. As explained above, the method for carrying out an operation for changing the digital map is advantageously used in such a manner that a plurality of map objects are changed together during a change operation in such a manner that the consistency of the digital map is preserved as a result. Conversely, the information contained in the update data record transmitted to the vehicle according to the invention therefore enables the vehicle to check the consistency of its digital map and to establish said consistency by means of further steps, if necessary.

In this respect, those version numbers of the further map objects which are contained in the update data record can be advantageously compared with the version numbers of the further map objects contained in the digital map stored in the vehicle. The further map objects to be updated can then be determined. For this purpose, it is possible to preferably check whether and possibly in what version the further map objects are contained in the digital map stored in the vehicle. If a further map object is not contained in the digital map stored in the vehicle or if the version number of a further map object contained in the digital map stored in the vehicle is lower than that version number of the further map object which is transmitted as part of the update data record, this further map object can be determined as a further map object to be updated. The method according to the invention can now be carried out from the start for each further map object of this type to be updated.

With particular advantage, the method is iteratively carried out until no further map objects to be updated have been determined. As a result, a consistent digital map is then present in the vehicle since the dependent map objects have been checked and likewise updated if necessary for each updated map object.

In another configuration, the step of determining the first and/or further map objects to be updated can comprise determining the map objects in a predetermined radius around a location of the vehicle. In the case of activated route guidance, that is to say when a destination has been set and a route to the destination has been calculated, the step of determining the first and/or further map objects to be updated can alternatively or additionally comprise determining the map objects along the route from the location of the vehicle to the destination. In order to also cover the possible situation in which the driver of the vehicle deviates slightly from the route (for example in order to look for a restaurant in the vicinity for a driving break or to look at a tourist attraction), the step of determining the first and/or further map objects to be updated can additionally or alternatively comprise determining the map objects within a corridor of a predetermined width around the route.

In another configuration, provision may be made for the calculation of the route to be repeated after the map objects along and/or close to the route have been updated. It is conceivable for a differing route to result on account of the map update. In this case, provision may be made for the method to be carried out again with the changed route. This method can also be iteratively repeated until there is no longer a change in the route and/or no map objects to be updated are determined.

The invention also comprises a control device which is intended for arrangement in a vehicle and is set up to carry out those method steps of the method described above which are to be carried out in the vehicle. Such a control device may be or comprise a so-called head unit, in particular. The invention also comprises a vehicle having such a control device.

The invention also comprises a central computer which is set up to carry out those method steps of the method described above which are to be carried out in the central computer.

Finally, the invention comprises a computer program product comprising stored instructions which, when executed on the control device and/or the central computer, cause the method steps described above to be carried out.

Other objects, advantages and novel features of the present invention will become apparent from the following detailed description of one or more preferred embodiments when considered in conjunction with the accompanying drawings.

DETAILED DESCRIPTION OF THE DRAWINGS

Identical reference signs in the figures denote identical or identically acting features of the illustrated embodiments of the invention. It is pointed out that the illustrated figures and the associated description are only exemplary embodiments of the invention. In particular, illustrations of combinations of features in the figures and/or in the description of the figures should not be interpreted such that the invention necessarily requires the implementation of all features mentioned. Other embodiments of the invention may contain fewer, more and/or other features. The scope of protection and the disclosure of the invention emerge from the accompanying patent claims and the complete description. It is also pointed out that the illustrations are basic illustrations of embodiments of the invention. The arrangement of the individual illustrated elements with respect to one another is selected only as an example and can be selected differently in other embodiments of the invention.

Figure 1:
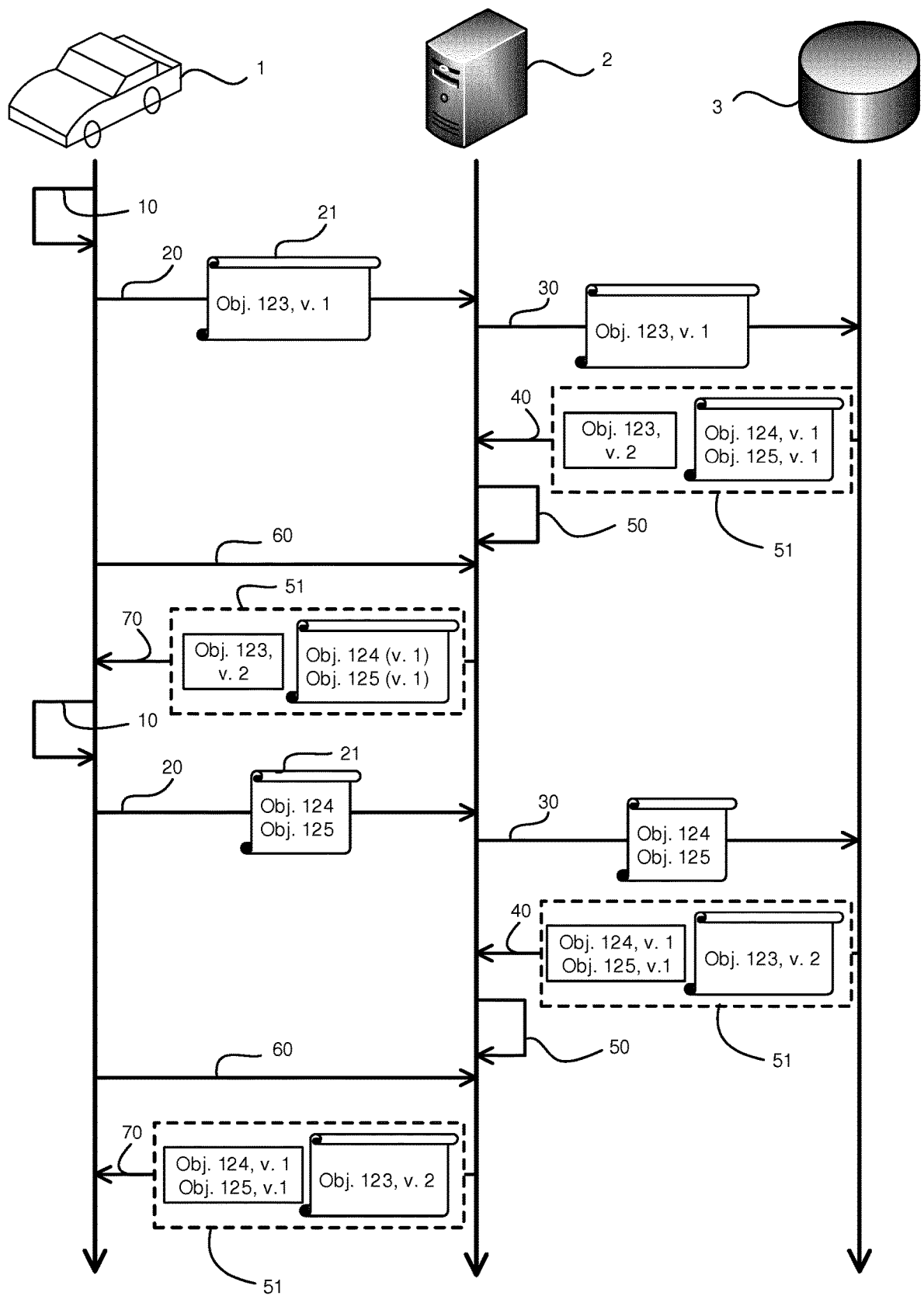
FIG. 1 shows a data communication sequence according to one embodiment of the method according to the invention.

FIG. 1 illustrates a data communication sequence between a vehicle 1, a central computer 2 and a central database 3. It is pointed out that the central computer 2 and the central database 3 may also form a common unit. In particular, the central database 3 may be part of the central computer 2. The central computer 2 may be, in particular, a server belonging to a map provider which is accessible via the Internet. The connection between the vehicle 1 and the central computer 2 (which may therefore correspond to a connection between the vehicle 1 and the Internet) can be established by way of wireless data communication, for example. In particular, the vehicle 1 may have, for this purpose, a telematics module which is set up for wireless data communication via WLAN and/or mobile radio networks (for example LTE, UMTS, etc.).

Figure 2A:
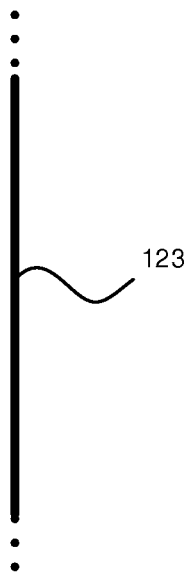
FIGS. 2A-2C show a partial illustration of map objects in a central database.

In a first method step 10, the vehicle 1 determines a first map object to be updated. In the present example, the object 123 was determined as the first map object to be updated. The object 123 is a road section ("link"), as illustrated in FIG. 2A. The dotted illustration of the ends of the road in FIG. 2A is intended to indicate that the road continues in both directions. The reason why the object 123 was determined as the first map object to be updated when carrying out the method step 10 may be, for example, because a navigation system of the vehicle 1 has calculated a route from the current location of the vehicle 1 to a destination which comprises the road section represented by the map object 123.

Figure 2B:
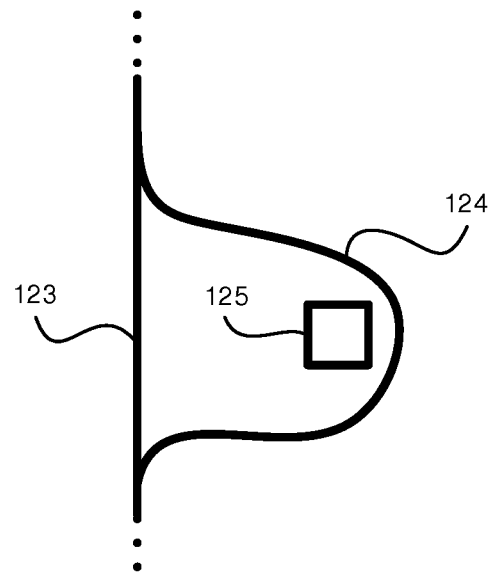

A practical exemplary embodiment of the method according to the invention for carrying out an operation for changing the digital map stored in the central database 3 shall now be explained first of all with reference to subfigures (a), (b) and (c) of FIG. 2. In this case, FIG. 2A illustrates an earlier state and FIG. 2B illustrates a later state of the digital map. A comparison of the two subfigures (a) and (b) shows that the road comprising the road section 123 has been extended with a bypass road 124. An object 125 which may be, for example, a "point of interest" (POI), for example a gas station 125, is on the bypass road 124. The construction of the bypass road 124 and of the gas station 125 may necessitate yet further changes to the digital map which are not shown in FIG. 2 only for reasons of a simplified illustration. For example, the entrances and exits of the road section 123 to and from the bypass road 124 may be represented by separate map objects.

In order to ensure the consistency of the digital map, a change operation must comprise a change of all digital map objects 123, 124, 125 which have mutual dependencies. For example, it would not be possible to add only the gas station 125 during an operation of changing the digital map. This is because there would then be no possible way of getting to the gas station 125 in the digital map which has been changed in this manner. The practice of capturing the bypass road 124 but not its connection to the road section 123 (for example exits, entrances, intersections or the like; not separately identified in FIG. 2) would likewise not result in a consistent digital map. Methods, procedures and tools for changing a digital map in such a manner that it is consistent as a result are known to a person skilled in the art. These methods are not part of the present invention. However, it is important for the present invention that each change operation results in a consistent digital map.

Figure 2C:
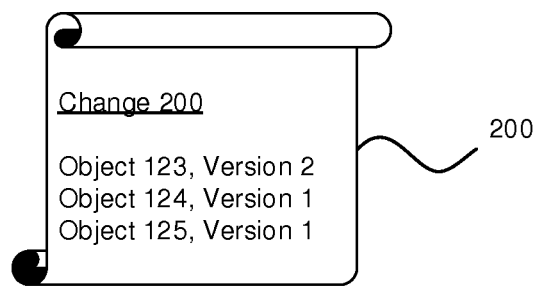

The earlier state of the map object 123 illustrated in FIG. 2A has the version number 1. The later state of the digital map illustrated in FIG. 2B has the newly added objects 124, 125 and a later version of the object 123. Therefore, the objects 124, 125 each have the version number 1, whereas the version number of the object 123 has been incremented and is now 2. In addition to the actual map objects 123, 124, 125, a change operation data record 200 is stored in the central database 3. This data record is illustrated in FIG. 2C. The change operation data record 200 comprises:

(i) an identifier of the change operation ("change 200"),
(ii) the object identifiers of the changed map objects 123, 124, 125 ("object 123", "object 124", "object 125"), and
(iii) the incremented version numbers of the changed map objects 123, 124, 125; in this case, the changed map object 123 is given the incremented version number 2 ("version 2"), whereas the newly added map objects 124, 125 are given the version number 1 ("version 1").

After the method according to the invention for carrying out the operation for changing the digital map has been concluded, the digital map therefore contains only those versions of the map objects 123, 124, 125 which are illustrated in FIG. 2B. However, it can be understood, by means of the change operation data record 200 likewise stored in the map database 3, which map objects have been changed together on account of their dependencies.

The exemplary performance of the method for updating the digital map stored in the vehicle 1 is now explained further with reference to FIG. 1. In step 20, the vehicle transmits a request data record 21 for updating the first map object 123 to the central computer 2. The update data record 21 contains the object identifier ("object 123") and the version number ("v.1") of the first map object 123.

In step 30, the central computer 2 forwards the information received from the vehicle 1 to the central database 3 and thus determines an operation 200 for changing the first map object 123 in comparison with that version of the first map object 123 which is identified by the transmitted version number. In other words, the central computer 2 thus queries the central database 3 in this step 30 in order to determine whether and possibly which changes to the map object 123 have taken place since the version number 1.

In the present example, an updated version of the map object 123, namely version number 2, is present in the central database 3. The change of the map object 123 from version number 1 to version number 2 was carried out in the course of the change operation 200. On the basis of the associated change operation data record 200, the central database 3 can determine in step 40 whether and possibly which further map objects have been changed during the change operation 200. In this case, these are the map objects 124, 125 which were newly added in the course of the change operation 200 and therefore each have the version number 1.

In the subsequent step 50, the central computer 2 compiles an update data record 51 which contains the data and information described above, namely:
(i) the current version of the first map object 123 and its version number ("v.2"), and
(ii) the respective object identifier and the respective version number of the further map objects 124, 125.

It is pointed out that the further map objects 124, 125 themselves are not part of the update data record 51. The update data record 51 comprises only the information needed to uniquely identify these map objects 124, 125. In this manner, the vehicle 1 can subsequently initially check whether the current versions of the further map objects 124, 125 are already available to it or whether it must also request them from the central computer 2.

It is pointed out that steps 30, 40, 50 carried out by the central computer 2 and the central database 3 need not necessarily be carried out in the form and order illustrated and described herein. Any possibility known to a person skilled in the art for a database query which results in the contents of the update data record 51 can be used for the method.

In step 70, the update data record 51 is transmitted from the central computer 2 to the vehicle 1. In some embodiments of the invention, provision may be made for this to be carried out only on the explicit request 60 of the vehicle 1. In other embodiments, such a request 60 is not provided and the central computer 2 transmits 70 the update data record 51 directly after the update data record 51 has been compiled 50. An explicit request 60 may be advantageous if the vehicle 1 would like to receive a transmission of the update data record 51 at a particular time at which there is a better data connection (for example a WLAN connection or a mobile radio connection with a higher data rate), for example.

Those version numbers of the further map objects 124, 125 which are contained in the update data record 51 are then compared in the vehicle 1 with the version numbers of the same map objects 124, 125 in the digital map in the vehicle 1 (the comparison method step is not illustrated in FIG. 1). In the present example, it is determined in this case that the further map objects 124, 125 were previously not present in the digital map in the vehicle 1. Therefore, the further map objects 124, 125 are determined as further map objects 124, 125 to be updated. Proceeding from this step of determining 10 the map objects to be updated, the previous method is then carried out again. This consubstantiality of the method steps which are possibly carried out iteratively is indicated in FIG. 1 by the use of identical reference signs for the respective method steps (10-70).

The map objects 124, 125 are therefore determined as map objects to be updated in method step 10. A request data record 21 for updating the map objects 124, 125 is then transmitted from the vehicle 1 to the central computer 2 (step 20). In the manner already described, method steps 30, 40, 50 result in the compilation of an update data record 51. This data record now contains the current versions of the map objects 124, 125 and the associated version numbers (each "v.1"). The map objects 124, 125 were inserted into the digital map during the change operation 200. As illustrated in FIG. 2C, the map object 123 was also changed during this change operation 200, namely updated to the version number 2. This information is therefore also part of the update data record 51 which is transmitted from the central computer 2 to the vehicle 1 in step 70.

For clarification, it is pointed out that, in the second run of the method just described, the map objects 124, 125 represent the first map objects to be updated, whereas the map object 123 represents a further map object.

In the further course, that version number of the further map object (therefore map object 123 with the version number 2) which is contained in the update data record 51 is again compared in the vehicle 1 with the version number of the further map object contained in the digital map stored in the vehicle 1. In this case, the comparison reveals that the map object 123 is already present in the vehicle 1 in the version 2 and therefore no longer needs to be updated. Since no further map objects to be updated have therefore been determined, the method is concluded. Provision is preferably made for the changes as a whole to be adopted in the digital map in the vehicle 1 only at this time, that is to say when all map objects 123, 124, 125 to be updated are present in the vehicle 1. Therefore, inconsistencies cannot arise either when carrying out the method for updating the map.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for updating a digital map stored in a vehicle, wherein the digital map comprises a multiplicity of map objects, wherein an object identifier and a version number are assigned to each map object, the method comprising the steps of:
   determining, by the vehicle, a first map object to be updated;
   transmitting a request data record for updating the first map object from the vehicle to a central computer, wherein the request data record comprises the object identifier and the version number of the first map object;
   determining, by the central computer, an operation for changing the first map object in comparison with that version of the first map object which is identified by the transmitted version number;
   performing the operation for changing the first map object and incrementing the version number of the first map object;
   determining, by the central computer, further map objects that are dependent on the first map object and that are changed or added as a result of the change operation of the first map object, wherein the further map objects are changed or added in order to ensure a consistency of the digital map in conjunction with the change operation of the first map object and the respective version number of each of the further map objects is incremented or created;
   compiling, by the central computer, an update data record consisting of:
   (i) a current version of the first map object,
   (ii) the version number of the current version of the first map object, and
   (iii) the respective object identifier and the respective version number of each of the further map objects; and
   transmitting the update data record from the central computer to the vehicle.

2. The method as claimed in claim 1, further comprising the steps of:
   comparing those version numbers of the further map objects which are contained in the update data record with the version numbers of the further map objects contained in the digital map stored in the vehicle;
   determining the further map objects to be updated; and
   updating the further map objects.

3. The method as claimed in claim 1, wherein the method is carried out iteratively until no further map objects to be updated have been determined.

4. The method as claimed in claim 1, wherein the step of determining the first and/or further map objects to be updated comprises determining the map objects:
   (i) in a predetermined radius around a location of the vehicle, and/or
   (ii) along a route from a location of the vehicle to a destination, and/or
   (iii) within a corridor of a predetermined width around a route from a location of the vehicle to a destination.

5. A vehicle, comprising:
   a control device for updating a digital map stored in a vehicle, wherein the digital map comprises a multiplicity of map objects, and further wherein an object identifier and a version number are assigned to each map object, wherein the control device is operatively configured to execute a program to:
   determine a first map object to be updated;
   transmit a request data record for updating the first map object from the vehicle to a central computer, wherein the request data record comprises the object identifier and the version number of the first map object; and
   receive an update data record from the central computer to the vehicle after the central computer performs an operation for changing the first map object and increments the version number of the first map object, wherein the update data record consists of:
   (i) a current version number of the first map object,
   (ii) a version number of the current version of the first map object, and
   (iii) a respective object identifier and a respective version number of each of further map objects that are dependent on the first map object and that are changed or added as a result of updating the first map object, wherein the further map objects are changed or added in order to ensure a consistency of the digital map in conjunction with the change operation of the first map object and the respective version number of each of the further map objects is incremented or created.

6. The vehicle as claimed in claim 5, wherein the control device further executes the program to:
   compare those version numbers of the further map objects which are contained in the update data record with the version numbers of the further map objects contained in the digital map stored in the vehicle;
   determine the further map objects to be updated; and
   execute the program for the further map objects to be updated.

7. The vehicle as claimed in claim 6, wherein the control device executes the program iteratively until no further map objects to be updated have been determined.

8. A central computer for updating a digital map stored in a vehicle, wherein the digital map comprises a multiplicity of map objects, and further wherein an object identifier and a version number are assigned to each map object, the central computer comprising:
   a processor configured to execute a program to:
   receive a request data record for updating a first map object from the vehicle to be updated, wherein the request data record comprises the object identifier and the version number of the first map object;
   determine an operation for changing the first map object in comparison with that version of the first map object which is identified by the transmitted version number;
   perform the operation for changing the first map object and incrementing the version number of the first map object;
   determine further map objects that are dependent on the first map object and that are changed or added as a result of the change operation of the first map object, wherein the further map objects are changed or added in order to ensure a consistency of the digital map in conjunction with the change operation of the first map object and the respective version number of each of the further map objects is incremented or created;
   compile an update data record consisting of:
   (i) a current version of the first map object, (ii) the version number of the current version of the first map object, and
(iii) the respective object identifier and the respective version number of each of the further map objects; and transmit the update data record to the vehicle.

9. The method as claimed in claim 1, wherein the update data record does not include current versions of the further map objects.

10. The vehicle as claimed in claim 5, wherein the update data record does not include current versions of the further map objects.

11. The central computer as claimed in claim 8, wherein the update data record does not include current versions of the further map objects.

* * * * *